United States Patent [19]

Sullivan

[11] 4,454,597

[45] Jun. 12, 1984

[54] CONFORMAL ARRAY COMPENSATING BEAMFORMER

[75] Inventor: Edmund J. Sullivan, Portsmouth, R.I.

[73] Assignee: The United States of America as represented by the Secretary of the Navy, Washington, D.C.

[21] Appl. No.: 374,207

[22] Filed: May 3, 1982

[51] Int. Cl.[3] .............................................. G01S 3/82

[52] U.S. Cl. ...................................... 367/12; 367/13; 367/125

[58] Field of Search ...................... 367/12, 13, 97, 125

[56] References Cited

U.S. PATENT DOCUMENTS 3,942,150 3/1976 Booth et al. .......................... 367/13

*Primary Examiner*—Richard A. Farley

*Attorney, Agent, or Firm*—Robert F. Beers; Arthur A. McGill; Michael J. McGowan

[57] ABSTRACT

A narrow band compensating beamformer for a receiving array that conforms to some surface other than a plane and thus is, in general, three dimensional. The array comprises a number of sensing elements arranged in a non-planar pattern. Each sensing element has its output signal delayed or phase shifted as a function of the receiving angle by the beamformer in such a way as to produce an equivalent "projected planar array" in a particular direction. This arrangement has the same beam pattern in the selected direction as an equivalent planar array with its lower side lobe characteristics permitting the taking of advantage of well known, low side lobe shading techniques.

8 Claims, 6 Drawing Figures

CONFORMAL ARRAY COMPENSATING BEAMFORMER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a narrow band compensating beamformer for a receiving array and more particularly to a compensating beamformer for an array that conforms to some surface other than a plane, thus being three dimensional, where the output signal of each array sensing element is delayed or phase shifted in such a fashion as to produce the equivalent array one would get by projecting each hydrophone onto a plane at some desired orientation. Low side lobe shading techniques available for planar arrays can then be used to improve performance.

(2) Description of the Prior Art

Conformal arrays do not generally lend themselves to efficient low side lobe shading and for this reason the side lobe behavior of conformal arrays is inferior to that of planar arrays.

The Navy has long used planar array sensors for torpedoes and other craft. There are instances however when it is more advantageous structurally to have array sensing elements conform to a non-planar surface of the vessel which carries it. Unfortunately, experience has shown that these conformal arrays exhibit higher side lobe behavior which does not readily lend itself to low side lobe shading techniques. When is needed is an array beamformer which allows effective shading of the side lobes which result from the signals received from a conformal array.

SUMMARY OF THE INVENTION

Accordingly, it is a general purpose and object of the present invention to provide a compensating beamformer for a conformal array. It is a further object to delay or phase shift the output of each array sensing element as a function of the receiving angle. Another object is that the delay or phase shift be such that an equivalent projected planar array is formed in a particular direction. A still further object is to shade the projected planar array using well known low side lobe shading techniques for planar arrays. These and other objects of the present invention will become apparent when considered in conjunction with the specification and drawings.

These objects are accomplished with the present invention by providing a conformal array compensating beamformer comprising a plurality of analog-to-digital converters, one connected to each array sensing element for converting incoming analog acoustic signals to digital form using quadrature sampling techniques. Digital signals from at least four such sensing elements are used to compute phase angle information which is then combined in a plurality of multipliers with stored scale factor data from a read only memory (ROM) to determine the appropriate phase shift for each sensing element output. This phase shift information is then used to control a plurality of phase shifters, each of which shift the phase of its corresponding sensing elements' signal before transmitting the shifted signal to a summing junction where all sensing element signals, appropriately phase shifted to effect a projected planar array, are added thus producing the output of the beamformer.

DESCRIPTION OF THE PREFERRED EMBODIMENT

Figure 1:
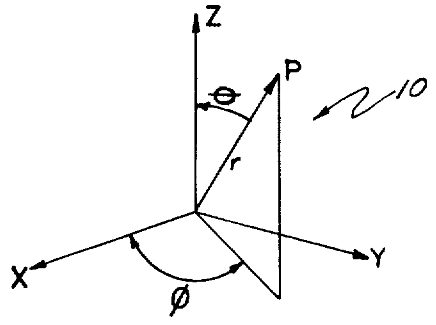
FIG. 1 shows a spherical coordinate system indicating the convention adopted for description of subject invention.

FIG. 1 shows spherical coordinate system 10 depicting the convention adopted to describe subject invention. The principle of operation of the present invention is as follows. The amplitude pattern function, $P(\theta,\phi)$, for a three-dimensional array of point isotropic sensing elements such as omnidirectional hydrophones is defined by the equation:

$$P(\theta,\phi) = \sum_{n=1}^{N} A_n e^{i\bar{k}\cdot\bar{r}_n} \quad (1)$$

where: $\bar{r}_n$ is the position vector of the nth sensing element with standard Cartesian components $(X_n,Y_n,Z_n)$; $\theta,\phi$ are standard polar angles; N is the number of array sensing elements; $A_n$ is the shading coefficient or weight (complex in general); $\bar{k}$ is the wave vector with magnitude $|k| = 2\pi/\lambda$ ($\lambda$ = wavelength), $k_x = |k| \sin\theta \cos\phi$, $k_y = |k| \sin\theta \sin\phi$, $k_z = |k| \cos\theta$.

Equation (1) can be rewritten as:

$$P(\theta,\phi) = \sum_{n=1}^{N} A_n e^{ik_xX_n + ik_yY_n + ik_zZ_n} \quad (2)$$

Figure 2:
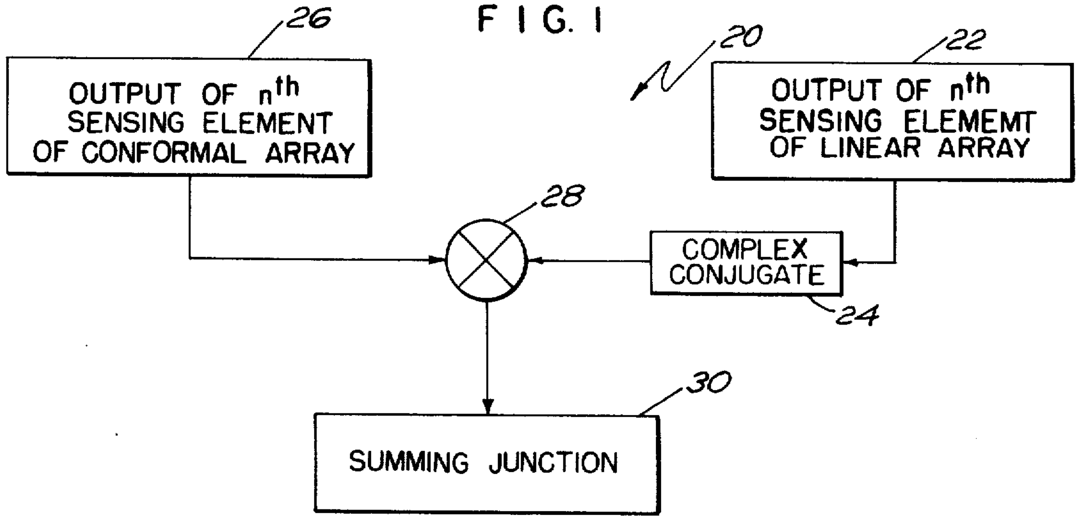
FIG. 2 shows a block diagram of a configuration according to the teachings of subject invention utilizing sensing elements from both a conformal array and a line array.

The term $ik_zZ_n$ in equation (2) may be written as $i|k| Z_n \cos\theta$. If the term $i|k| Z_n \cos\theta$ can be eliminated for all n and all angles $\theta$, then equation (2) becomes the expression for a planar array in the x-y plane. Referring now to FIG. 2 and making the observation that the expression $e^{ik_zZ_n}$ represents the output of the nth sensing element of a line array along the Z-axis with position $Z_n$, one can construct such an array, extract the output of the nth sensing element of the linear array 22, take the complex conjugate 24 and multiply that quantity by the output of the nth sensing element of the conformal array 26 in multiplier 28 before transmitting the result to summing junction 30. In this way an equivalent planar array signal results. This procedure is illustrated for the nth sensing element in FIG. 2. The resulting array may now be shaded as if it were the planar array obtained by projecting the sensing element onto the x-y plane and the superior beam patterns of said planar array may be realized. This approach however does require an auxiliary array. A superior implementation is realized by noting that the phase factor of each output of the auxiliary array can be obtained from just one sensing element. Assuming then that we have the phase of the kth sensing element, the phase of the mth sensing element can be obtained by multiplying by the term $Z_m/Z_k$;

$$k_z Z_m = k_z Z_k (Z_m/Z_k) \quad (3)$$

Furthermore, the kth sensing element can be the actual kth sensing element of the conformal array itself, thus eliminating the auxiliary array completely.

It should be noted that the phase of the kth sensing element of the conformal array, $k_z Z_k$, cannot be obtained directly from the kth sensing element alone. The phase of at least three sensing elements must be measured and processed to obtain the needed quantity $k_z Z_k$. By using four sensing elements instead of three there are symmetries in the array's geometry whereby the calculations needed are simplified.

Figure 3:
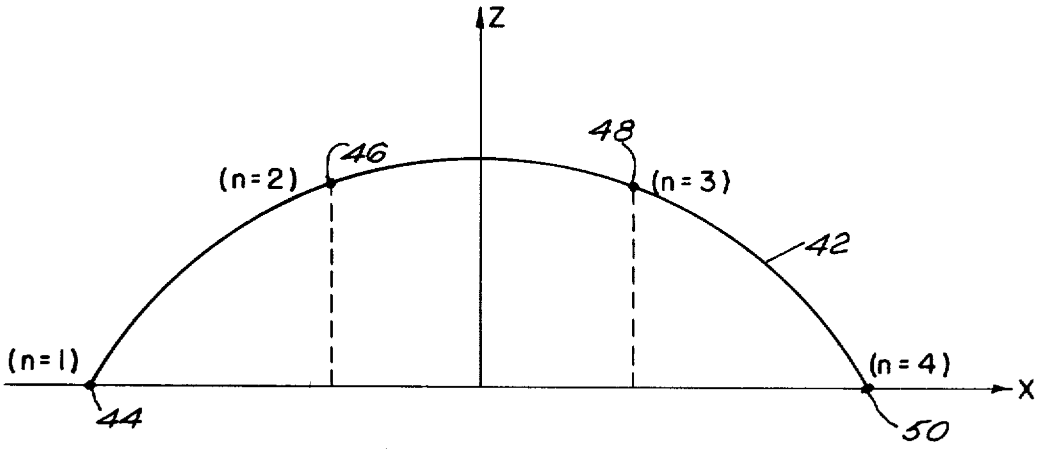
FIG. 3 shows four symmetrically disposed array elements selected from an array conforming to a spherical surface.

Referring now to FIG. 3, there is shown an array 40 comprising sensing elements 44, 46, 48 and 50 which conform to a spherical surface 42. This array may have any number of sensing elements greater than four; however, only the four relevant to the discussion are shown. Note that the Z-axis is an axis of symmetry. The phase, in general, of such a sensing element is given by equation (1) supra where:

$$\bar{k}\cdot\bar{r}_n = k[X_n \sin\theta \cos\phi + Y_n \sin\theta \sin\phi + Z_n \cos\theta] + \psi = \phi_n \quad (4)$$

The term $\psi$, omitted in equation (1), represents the time dependence of the acoustic signal which as will be shown cancels out.

Since sensing elements 44, 46, 48 and 50 are in the x-z plane, $\phi=0$ and therefore $\cos\phi=1$. Expanding equation (4) for each of the four sensing elements, the phases of the four elements can now be written as:

$$\phi_1 = kX_1 \sin\theta + \psi \quad (5)$$

$$\phi_2 = k[X_2 \sin\theta + Z_2 \cos\theta] + \psi \quad (6)$$

$$\phi_3 = k[X_3 \sin\theta + Z_3 \cos\theta] + \psi \quad (7)$$

$$\phi_4 = kX_4 \sin\theta + \psi \quad (8)$$

where $X_2$, $Z_2$ represent the x and z coordinates of the second sensing element, etc. Note that the coordinates have been selected such that $Z_1=Z_4=0$. Now by symmetry, $-X_4=X_1$, $-X_3=X_2$ and $Z_2=Z_3$. Substituting in equations (5) through (8) supra it can easily be verified that:

$$kZ_2 \cos\theta = \tfrac{1}{2}[\phi_2+\phi_3-\phi_1-\phi_4] = k_z Z_2 \quad (9)$$

Once phase shift $k_z Z_2$ for sensing element 2 is obtained, it can be scaled by the appropriate $Z_k/Z_2$ scale factor to obtain the necessary phase shifts for the other sensing element outputs.

Figure 4:
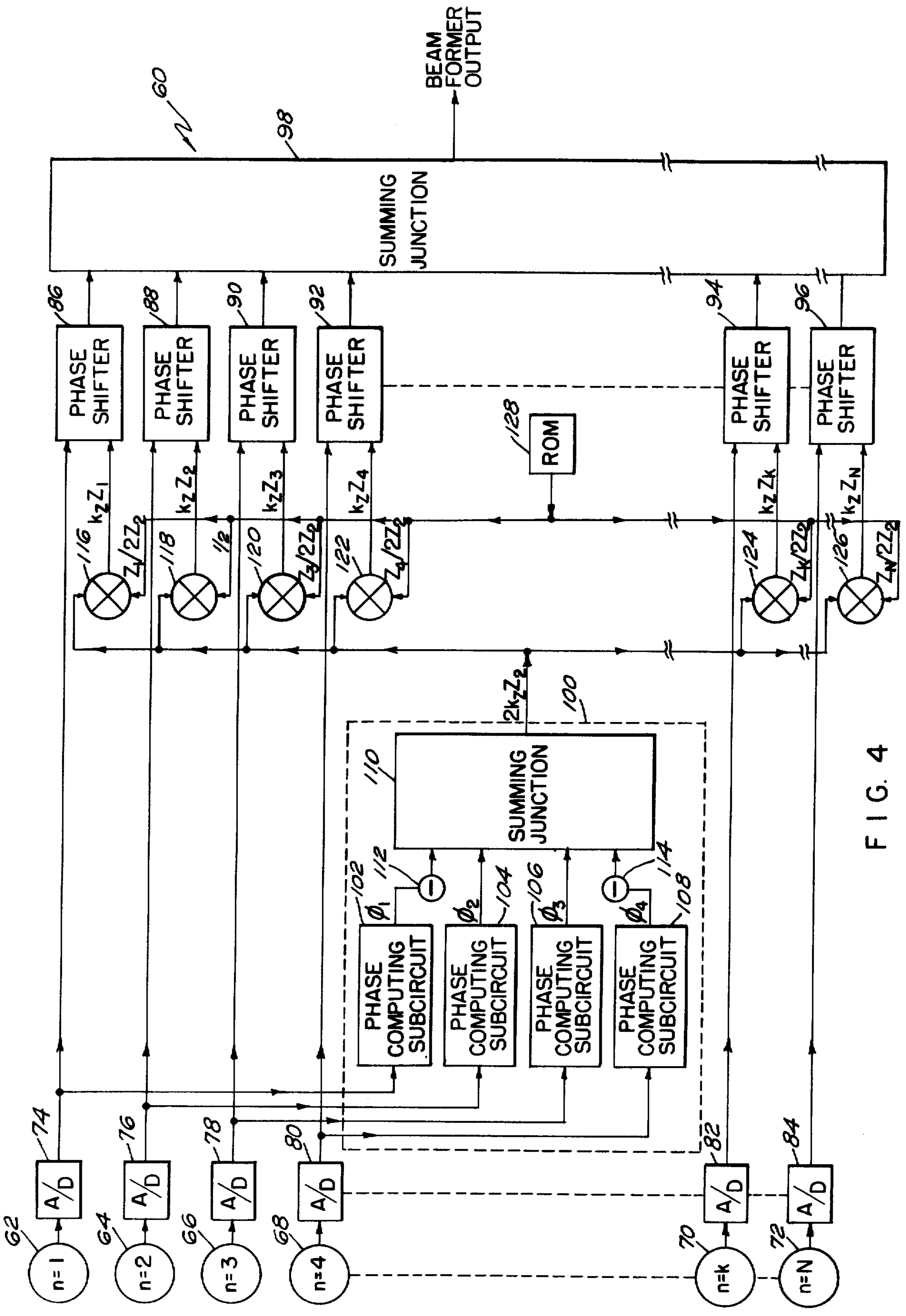
FIG. 4 shows a block diagram of a compensating beamformer built according to the teachings of subject invention.

FIG. 4 shows a conformal array compensating beamformer device 60 built according to the teachings of subject invention. Beam-former 60 further comprises a plurality of array sensing elements 62, 64, 66, 68, 70 and 72 each having connected thereto analog-to-digital (A/D) converters 74, 78, 79, 80, 82 and 84, respectively. Each sensing element converts incoming sound signals to analog electric signals which are then A/D converted to real and imaginary digital signals by means of quadrature sampling. Note that sensing elements 62, 64, 66, 68, 70 and 72 represent typical elements of an n element array labeled n=1, 2 - - - k - - - N. The digital outputs of A/D converters 74, 76, 78, 80, 82 and 84 are transmitted to corresponding phase shifters 86, 88, 90, 92, 94 and 96 respectively where each undergoes an appropriate phase shift. The digital output of each phase shifter is then transmitted to summing junction 98 where they are added to form the beam pattern for the frequency band of interest. The digital outputs of A/D converters 74, 76, 78 and 80 are concurrently transmitted to phase computing circuit 100 comprising subcircuits 102, 104, 106 and 108 respectively. The digital phase angle outputs of subcircuits 104 and 106 are transmitted directly to summing junction 110. The digital phase angle outputs of subcircuits 102 and 108 are made negative in inverters 112 and 114 respectively before transmittal to junction 110. The four outputs are added in summing junction 110 to produce the phase shift of sensing element 2, i.e., $2k_z Z_2$. This phase shift is then transmitted to each of multipliers 116, 118, 120, 122, 124 and 126 connected to phase shifters 86, 88, 90, 92, 94 and 96 respectively. Appropriate $Z_k/2Z_2$ values for each sensing element, stored in ROM 128, are transmitted to multipliers 116, 118, 120, 122, 124 and 126 where they are multiplied by phase shift value $2k_z Z_2$ to produce the appropriate phase shift at phase shifters 86, 88, 90, 92, 94 and 96 respectively.

Figure 5:
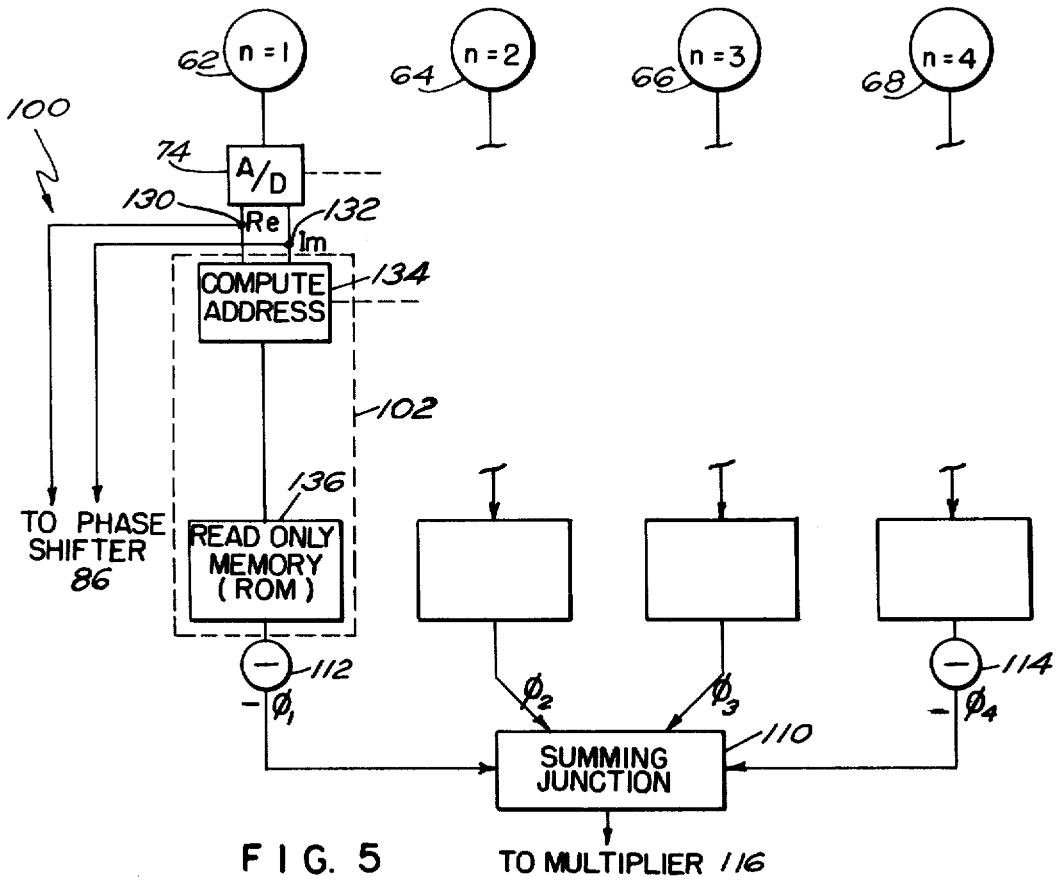
FIG. 5 shows a detail block diagram of the phase computing circuit of FIG. 4.

FIG. 5 shows a detail block breakdown of phase computing circuit 100 of FIG. 4. While only complete subcircuit 102 is described for sensing element 62 it is understood that identical subcircuits 104, 106 and 108 are used for sensing elements 64, 66 and 68 respectively. The analog output signal of sensing element 62 is quadrature sampled in A/D converter 74 yielding the real digital part 130 and the imaginary digital part 132 of the analog signal at that particular sample time. Quadrature sampling is a standard procedure where the analog signal is sampled twice per cycle, one quarter cycle apart. This effectively produces the real and imaginary parts of a complex number which contain the magnitude and phase information of the signal for the particular sample time with which it is associated. Dual lines 130 and 132, labeled Re and Im, indicate that the digital signal is in complex form. What is needed at this point is the phase angle of the phasor associated with this complex number, which is the arctangent of the ratio of the imaginary part 132 and the real part 130. Rather than actually perform this time-consuming calculation, this complex number is used in subcircuit 102 by address computer 134 to determine the address of the arctangent that is stored in ROM 136. The arctangent that is stored at this address in ROM 136 is then called.

Four of these phase computations are required, as indicated in FIGS. 4 and 5 to produce $\phi_1$–$\phi_4$. Picking sensing elements 1 through 4 as the four elements whose phases are used to compute $k_z Z_2$, as in equation (9), the output of summing junction 110 is then scaled, by multiplying in multipliers 116, 118, 120, 122, 124 and 126 by $Z_1/2Z_2$, etc. to produce the required phase shifts. Thus, the outputs of the N transducer elements labeled n=1, 2 - - - k, - - - N, are to be shifted back by phase shifters 86, 88, 90, 92, 94 and 96 by the amounts $k_z Z_1$, $k_z Z_2$ - - - $k_z Z_k$ - - - $k_z Z_N$. This removes the effect of the Z-coordinates of the array elements on the output of the beamformer, thus producing the desired beam pattern of the projected planar array.

Following the multiplications, which are straightforward, phase shifters 86, 88, 90, 92, 94 and 96 accomplish their function by performing a complex multiply operation. Phase shifter 86, typical of all the phase shifters, is shown in greater detail in FIG. 6. Phase shifting is performed as follows. Once the quantity, $2k_zZ_2$, is obtained from block 110 and rescaled in multiplier 116 using data for sensing element 62, stored in ROM 128, it is put into quadrature form by block 140 and complex multiplied by the digital output of A/D converter 74 in complex multiplier 146. The digital output of multiplier 146, represented as real part 148 and imaginary part 150 is then transmitted to summing junction 98.

Figure 6:
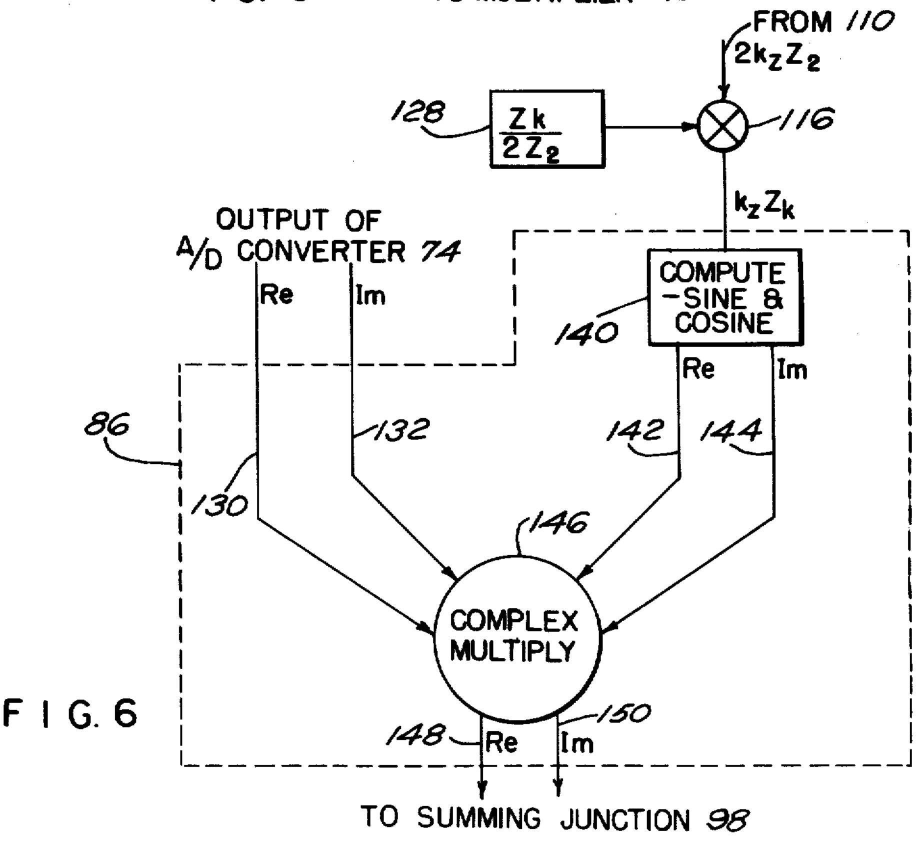
FIG. 6 shows a detail block diagram of a typical phase shifter of FIG. 4.

Note that the *negative* sine is computed when converting the signal to complex form in block 140. This is because the phase must be shifted back instead of forward by complex multiplier 146. For an N-element array, N circuits of the form shown in FIG. 6 are required.

For this kind of pipeline operation, a quadrature sample rate of 100 kHz is not unreasonable. This is equivalent to a 100 kHz signal. An 8-bit word would provide ample phase resolution.

Since the concept is narrow-band, a broad-band system would require a circuit as shown in FIG. 4 for each narrow frequency band in the broad-band spectrum.

What has thus been described is a conformal array compensating beamformer comprising a plurality of analog-to-digital converters, one connected to each array sensing element for converting incoming analog acoustic signals to digital form using quadrature sampling techniques. Digital signals from at least four such sensing elements are used to compute phase angle information which is then combined in a plurality of multipliers with stored scale factor data from a ROM to determine the appropriate phase shift for each sensing element output. This phase shift information is then used to control a plurality of phase shifters each of which shift the phase of its corresponding sensing elements signal before transmitting the shifted signal to a summing junction where all sensing element signals, appropriately phase shifted to effect a projected planar array, are added thus producing the output of the beamformer.

Obviously many modifications and variations of the present invention may become apparent in light of the above teachings. For example, array sensing elements may conform to any marine and medical sonar or radar non-planar surface. The array itself need not be symmetrical. Also, while a digital implementation has been described, analog signal processing techniques may also be used without deviating from the teachings of the instant invention.

In light of the above, it is therefore understood that within the scope of the appended claims, the invention may be practiced otherwise than as specifically described.

What is claimed is:

1. A conformal array compensating beamformer comprising:

a plurality of sensing elements, arranged in a non-planar configuration and adapted to receive incoming acoustic signals, for transforming said incoming acoustic signals into a plurality of proportional electrical analog signals;

a plurality of converting means for receiving said plurality of proportional electrical analog signals from said corresponding plurality of sensing elements and converting said plurality of proportional electrical signals into a plurality of digital signals;

phase computing means for receiving said digital signals from a preselected, at least three of said plurality of converting means, computing therewith the phase angles of the digital signals from each said preselected converting means and adding said phase angles in such a way as to produce phase shift factor $2k_zZ_2$;

a plurality of multiplier means, corresponding to said plurality of converting means, for multiplying said $2k_zZ_2$ phase factor from said phase computing means with a corresponding $Z_k/2Z_2$ scale factor selected from a plurality of $Z_k/2Z_2$ scale factors stored in ROM for values of k from 1 to N whereby a corresponding plurality of $k_zZ_k$ phase shifts are produced as the output of said multiplier means;

a plurality of phase shifting means for receiving said plurality of $k_zZ_k$ phase shifts from said corresponding plurality of multiplier means and said plurality of digital signals from said corresponding plurality of converting means, and shifting the phase of said plurality of digital signals by the amount of said corresponding plurality of phase shifts thereby producing a plurality of phase shifted digital signals as the output thereof; and summing means for receiving said plurality of phase shifted digital signals from said plurality of phase shifting means and adding said plurality of phase shifted digital signals so as to form the projected planar array output of said beamformer.

2. A conformal array compensating beamformer according to claim 1 wherein said plurality of converting means further comprises analog-to-digital converters using quadrature sampling techniques for converting said plurality of proportional electrical analog signals into said plurality of digital signals.

3. A conformal array compensating beamformer according to claim 2 wherein said phase computing means further comprises:

a plurality of phase computing subcircuits for receiving the real and imaginary parts of at least three of said plurality of digital signals from said plurality of converting means and computing the associated phase angles therefrom:

a plurality of inverting means for inverting the sign of at least two of the phase angles produced by said plurality of phase computing subcircuits; and a summing junction for receiving the phase angles from said plurality of phase computing subcircuits and said plurality of inverting means, and producing the phase shift factor $2k_zZ_2$ therewith.

4. A conformal array compensating beamformer according to claim 3 wherein each of said plurality of phase computing subcircuits further comprise:

an address former whereby said real and imaginary parts of the digital signal from a selected converting means are used to form an address; and a ROM for receiving said address from said address former and retrieving from said address in said ROM phase angle data stored thereat corresponding to said digital signal.

5. A conformal array compensating beamformer according to claim 4 wherein said plurality of phase shifting means further comprise:

a plurality of trigonometric computing means for receiving said plurality of $k_zZ_k$ phase shifts from said plurality of multiplier means and computing a corresponding plurality of sine and cosine signals associated therewith; and a plurality of complex multiplier means for receiving said plurality of sine and cosine signals from said plurality of trigonometric computing means and said plurality of digital signals from said plurality of converting means whereby the phase of said plurality of digital signals is shifted accordingly before being transmitted to said summing means.

6. A conformal array compensating beamformer according to claim 5 wherein said address former further comprises a microprocessor.

7. A conformal array compensating beamformer according to claim 6 wherein said plurality of phase computing subcircuits further comprise a quantity of four.

8. A conformal array compensating beamformer according to claim 7 wherein said plurality of inverting means further comprise a quantity of two.

* * * * *